Figure 1:
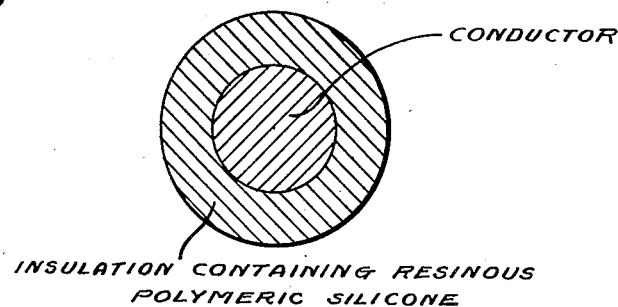

Oct. 9, 1945.  J. F. HYDE  2,386,466
INSULATED CONDUCTOR AND INSULATION THEREFOR
Filed Feb. 10, 1940

CONDUCTOR
INSULATION CONTAINING RESINOUS POLYMERIC SILICONE

CONDUCTOR
INSULATING FABRIC IMPREGNATED WITH A RESINOUS POLYMERIC SILICONE

Inventor
JAMES FRANKLIN HYDE
By F. H. Knight
Attorney

Patented Oct. 9, 1945

2,386,466

UNITED STATES PATENT OFFICE 2,386,466

INSULATED CONDUCTOR AND INSULATION THEREFOR

James Franklin Hyde, Corning, N. Y., assignor to Corning Glass Works, Corning, N. Y., a corporation of New York Application February 10, 1940, Serial No. 318,373

20 Claims. (Cl. 174—121)

This invention relates to organo-silicon compounds and polymeric products, and to the use of such products as protective coatings, impregnating agents and fillers for fabrics and fibrous materials. The properties of the new products make them especially valuable for electrical insulating purposes.

There has long been a need for a flexible electrical insulating medium which can be used in very thin layers and which will withstand relatively elevated temperatures without substantial deterioration in flexibility and electrical characteristics. Cotton, silk and paper fabrics decompose with charring at relatively low temperatures. Asbestos, which has the requisite temperature resistance for many electrical applications, must, because of its lack of mechanical strength, be employed in greater thickness than organic insulations. The recently developed fabrics of glass fibre on the other hand are thin and flexible and yet have a very high tensile strength and all the valuable electrical properties of glass. They will successfully withstand temperatures above 500° C. without impairment of their electrical properties and up to about 350° C. without substantial loss of their original flexibility. Although the dielectric strength of glass per se is high, that of the fabric made therefrom is no higher than the dielectric strength of the air filling the voids and spaces between the fibres. Therefore, the use of an impregnating dielectric medium is essential for displacing the interstitial air. The temperature at which glass fabrics can be employed for electrical purposes has been limited by the relatively low decomposition temperatures of prior impregnating materials. Prior heat resisting resins become brittle and charred when subjected to temperatures in excess of about 150° C. The electrical characteristics of the impregnated fabric are thereby seriously impaired. The windings of motors, dynamos, transformers, electro-magnets and other electrical equipment employing coils or covered conductors consequently have been objectionably bulky and they could not be built to operate efficiently at elevated temperatures.

The primary object of this invention is the production of organic substances which contain a large percentage of chemically combined silicon and which are stable throughout a wide range of temperatures.

Another object is to produce a resin which will be flexible and electrically insulating throughout a wide range of temperatures, which will not decompose at temperatures from 50° C. to 100° C. higher than the decomposition temperature of the best prior resins and which will not form a charred or carbonaceous residue at still higher temperatures.

A further object is to produce a coated and impregnated fabric of high resistivity and dielectric strength which will retain its flexibility and insulating qualities at temperatures as high as 300° C.

Still another object is to insulate wires and other conductors efficiently at temperatures up to 300° C. without objectionable increase in size.

The above and other objects may be accomplished by practicing my invention which comprises, among its features, an organo silicon polymer which is infusible and insoluble without decomposition and which contains chemically combined silicon equivalent to at least 20% $SiO_2$.

More specifically the invention comprises a condensation polymer of a silicone, the average molecular structure and composition of the polymer corresponding to at least four heterocyclic groups of alternate silicon and oxygen atoms, each silicon atom being attached to at least one carbon atom, the groups being joined by silicon-oxygen-silicon linkages.

Another feature of the invention comprises a fibrous material which is impregnated with a resinous organo-silicon polymer.

Still another feature of the invention comprises a metallic conductor which is covered with an electrically insulating layer containing the resinous polymer.

The new polymers can be prepared from various silicon compounds such as silicon tetrachloride and ethyl orthosilicate. For economic reasons I prefer to use silicon tetrachloride and the following description shows by way of example the preparation of organic silicon polymers therefrom and their application to textile fabrics to produce insulating coverings for wires and other conductors. In one embodiment of my invention the starting material is converted to a silicone, an organo-silicon oxide compound having the general formula $(R_2SiO)_n$, where R is either an alkyl or aryl radical, either or both of which may be present. These silicones, as will later appear, are polymeric and have a heterocyclic structure consisting of alternate silicon and oxygen atoms with two R groups attached directly to each silicon atom. I have found that by means of oxidation or hydrolysis some of the alkyl or aryl radicals, or both, as desired, can be displaced by oxygen and a plurality of the heterocyclic groups can be joined by the silicon-oxygen-silicon linkages thus provided, thereby forming new and useful products of high stability.

As an example, the polymerization of phenyl ethyl silicone will be described. This compound may be prepared from silicon tetrachloride by a series of steps involving first the Grignard reaction:

(1)     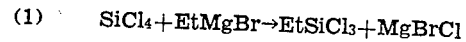

(2)     

In carrying out these reactions it is preferable to add the Grignard reagents slowly in order to maintain the silicon chloride in excess during the reaction, thereby discouraging the formation of trisubstituted and tetra-substituted compounds. After completion of each reaction the precipitated magnesium salts may be filtered out and the ether or other solvent in which the reaction was conducted may be separated by distillation. If desired, the product of each reaction may be further purified by fractional distillation under reduced pressure. However, it is advantageous for some purposes to omit the intermediate purification and in fact the two reactions may be carried on simultaneously in the same reaction mixture provided the two Grignard reagents can be mixed without co-reaction, as in the present instance. Inasmuch as the crude final product contains, in addition to the disubstituted silicon dichloride, small proportions also of the mono-, tri- and tetra-substituted compounds, it is advantageous for some purposes to use the crude product without conducting the final purification, as will later appear. In order that the invention may be more clearly set forth, the reactions of the purified disubstituted material will first be discussed.

The disubstituted silicon dichloride is converted to the corresponding silicane diol by hydrolysis and from this the silicone, sometimes called the anhydrosilicane diol, is formed by dehydration.

(3) $PhEtSiCl_2 + 2H_2O \rightarrow PhEtSi(OH)_2 + 2HCl$ (4) $2PhEtSi(OH)_2 \rightarrow 2PhEtSiO + H_2O$ The two reactions probably occur consecutively but appear to take place together. The reactions are carried out by slowly mixing an excess of water with the disubstituted silicon dichloride. The heat of reaction tends to increase the temperature, but for some purposes such increase should be restrained by suitable cooling as will appear. The residual water and the hydrochloric acid formed during the reaction can be separated by means of a separatory funnel and, if desired, the last traces may be evaporated under vacuum.

In like manner a great variety of silicones may be prepared containing various alkyl and/or aryl radicals including alkaryl radicals, heterocyclic radicals and other complex alkyl or aryl radicals which may be linked by a carbon atom to a silicon atom to form the silicone. The silicones are in general either crystalline compounds or oily substances of varying viscosities at room temperature.

It is unlikely that the silicones can exist in a monomeric form, because there is no proof that a double bond can exist between silicon and oxygen. My researches show that the silicones here contemplated are heterocyclic and trimeric and have the general structural formula:

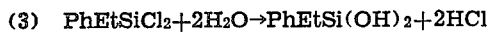

R being an alkyl or aryl radical. For example, the trimer of phenyl ethyl silicone

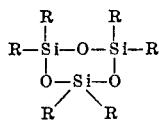

has a theoretical silica content of 40% and a molecular weight of 450. A sample of the product of Equation 3 above, from which the excess water and hydrochloric acid had been removed, was brought to constant weight under a vacuum at room temperature and the silica was determined by strong ignition of the sample to eliminate all organic matter. A silica content of 40.3% was obtained. A determination of the molecular weight of a similar dehydrated sample by the melting point method of K. Rast, as described in the book entitled "Quantitative Organic Microanalysis" by F. Pregl, 3rd edition Blackiston, page 237, yielded the result 445.

In polymerizing the silicones alkyl radicals may be displaced by oxidation and heat or aryl radicals may be displaced by hydrolysis and heat, preferably aided by a catalyst such as hydrochloric acid. The two types of reaction may be carried on simultaneously to displace both alkyl and aryl radicals at the same time.

For example, in order to polymerize phenyl ethyl silicone by displacing alkyl radicals, I heat it at about 200°–300° C. and at the same time bubble air through it. The evolution of acetaldehyde indicates that ethyl radicals are being removed and that oxidation is taking place. The viscosity of the liquid increases, which indicates that the size of the molecules is increasing or, in other words, that a polymerization is occurring. With a silicone having the heterocyclic trimeric structure above referred to, the reaction may be represented as follows:

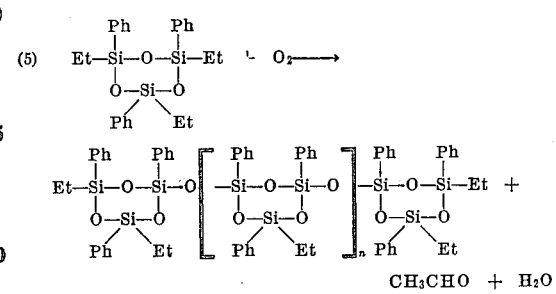

The viscosity further increases as the reaction is continued and at the end of several hours at the above noted temperatures the material has become highly viscous and sticky. At higher temperatures the reaction will proceed faster and less time may be required to attain high viscosity but appreciable loss by volatilization of the initial silicone may be incurred before polymerization can take place. When the material has attained the sticky, viscous stage, it is still soluble in toluene and like solvents, and is heat-convertible. Hence its molecular structure is believed to be largely at least of the chain type shown in Equation 5. If the viscous mass is further heated with access of air, it will harden to a flexible non-tacky resinous substance which is infusible and insoluble. Such change in properties is believed to be caused by the formation of cross linkages or side chains arising from the removal of ethyl groups from the sides of the chain structure of Equation 5 and the substitution of oxygen therefor, whereupon cross linkages of Si—O—Si to side chains occur. It is also possible that the change in properties is due to a closing of the chains to form cyclic polymers of high molecular weight. This is in accordance with the theory that open chain polymers are fusible and soluble and the introduction of cross chains results in infusibility and insolubility. In the above reaction for the removal of alkyl groups by oxidation, it is believed that the aryl groups are substantially unaffected. Alkyl groups may also be removed by other oxidizing reagents.

As an example of the polymerization of a silicone by removal of aryl groups and formation of Si—O—Si linkages, I heat phenyl ethyl silicone at about 170°–180° C. and at the same time slowly add thereto water and a catalyst such as aqueous hydrochloric acid dropwise. Benzene is evolved and the liquid becomes increasingly viscous, indicating that phenyl radicals are removed and that polymerization is occurring through the formation of Si—O—Si linkages. Here again with a silicone having the heterocyclic trimeric structure, the reaction may be represented as follows:

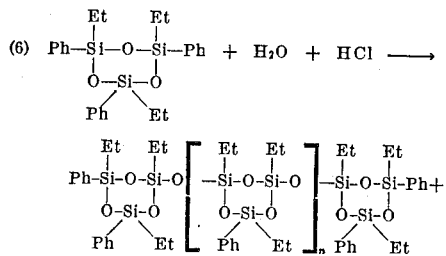

Continued heating at about 170°–180° C. with continued addition of aqueous hydrochloric acid will after a few hours bring the material to a sticky, viscous state, in which state it is still soluble in toluene and other solvents and is heat-convertible. Further heating, preferably at higher temperatures, converts it to a flexible, non-tacky resinous substance which is infusible and insoluble. Here also it is believed that the heat-convertible stage is characterized by a chain structure, such as that represented in Equation 6, and that the infusible and insoluble stage is characterized by the additional formation of a cross chain structure or, perhaps, closed chains, brought about by additional Si—O—Si linkages. Although it is possible that some alkyl radicals also may split off during the above described treatment with aqueous hydrochloric acid, especially if the containing vessel is open to the air, it is believed that alkyl radicals are substantially unaffected in the absence of oxidizing conditions.

It will now be apparent that an increase in the temperature of the reaction mixture of Equations 3 and 4, particularly an increase to about 170°–180° C., will at the same time bring about the reaction represented in Equation 6. In other words, a disubstituted aryl or aryl alkyl silicon dichloride can be hydrolyzed and dehydrated and at the same time the resulting silicone can, if desired, be polymerized by displacement of aryl radicals according to Equation 6, the HCl, which results as a by-product from the reaction according to Equation 3, constituting the catalyst. This is accomplished merely by increasing the temperature of the reaction mixture as above noted. However, if the aryl radicals are to be left in place, it will now be seen that the temperature of the reaction mixture in Equations 3 and 4 must be kept low, preferably well below 100° C. and the HCl must be removed by evaporation under vacuum before the silicone is polymerized.

Both alkyl and aryl radicals may be removed by a combination of reactions represented in Equations 5 and 6 and, as polymerization proceeds, the product becomes increasingly viscous until it attains the sticky, viscous state just short of insolubility after which, with further heating, it becomes a flexible, non-sticky, insoluble, infusible resinous substance. It is believed that here also the partially polymerized state representing the approximate limit of chain polymerization is characterized by a molecular structure which is a combination of those shown in Equations 5 and 6. Such a combination of reactions is carried out most simply by heating an aryl alkyl silicon dichloride, for example, phenyl ethyl silicon dichloride, at about 170°–180° C. for several hours and passing moist air into and through the liquid. Presumably, hydrolysis and dehydration occur, as shown in Equations 3 and 4, and the silicone is formed, but at the same time ethyl radicals are removed by oxidation, as shown in Equation 5, by the oxygen of the air which is being passed in, and phenyl radicals are removed by hydrolysis, as shown in Equation 6, by the aqueous hydrochloric acid according to Equations 3 and 4.

Another method of removing both alkyl and aryl radicals simultaneously is to treat the silicone with nitric acid. The acid removes alkyl radicals by oxidation and at the same time removes aryl radicals by nitration, nitrobenzene being evolved as a by-product.

When ethyl orthosilicate is used as a starting material, the procedure outlined above for silicon tetrachloride is used and the reactions which occur are similar to those noted for the latter material.

Dialkyl or diaryl silicon compounds are also prepared by the foregoing methods. For example, when dimethyl-diethoxy silicon is treated with an excess of water and air is bubbled through the mixture while the latter is heated at about 200°–250° C., a viscous, soluble, heat-convertible product is obtained which, on continued heating, is converted to an insoluble, infusible but flexible resinous substance. Hydrolysis and dehydration take place as follows:

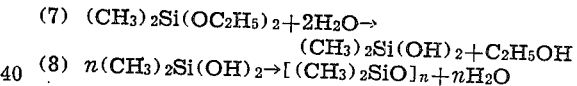

$$(8) \quad n(CH_3)_2Si(OH)_2 \rightarrow [(CH_3)_2SiO]_n + nH_2O$$

The reaction according to Equation 8, to some extent at least, occurs simultaneously with the reaction represented in equation 7 and further condensation and dehydration of the silicol takes place upon the application of heat to produce the silicone as a liquid having the above described heterocyclic structure comprising groups of alternate silicon and oxygen atoms. When air is passed through the heated silicone, some of the methyl radicals are oxidized to formaldehyde and replaced with oxygen atoms which form siloxane linkages between heterocyclic groups, thus:

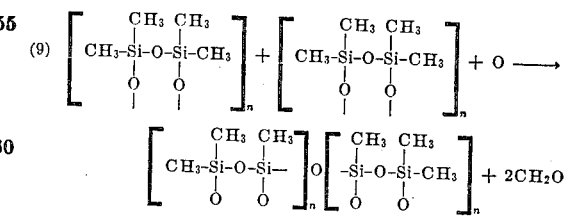

Diphenyl silicon dichloride, on being heated to about 170°–180° C. and having air bubbled through is likewise converted to a soluble, heat-convertible product which, on further heating at higher temperatures, changes to an insoluble, infusible but flexible resin.

The stage at which the material is highly viscous and sticky but is still soluble in toluene and other solvents is believed to mark the approximate limit to which polymerization with chain structure can be carried and the approximate point at which extensive formation of cross linkages begins. Hence, if it is desired to obtain the largest possible molecules while retaining solubility and heat-convertible characteristics, it is necessary to continue the polymerizing treatment as long as possible without causing the product to become insoluble. The progress of the polymerization may readily be observed by removing a small portion of the product with a glass rod from time to time as the polymerization proceeds and cooling it and observing its characteristics and solubility. It is characteristic of the new products in the sticky, viscous yet soluble state representing the approximate limit of chain polymerization that they show at most only a relatively small change in viscosity with change in temperature and hence are substantially free from objectionable flow during the subsequent treatment.

The experimental results of analysis and molecular weight determination indicate that the structure of the new products at the soluble, heat-convertible stage in their polymerization consists of molecular chains comprising an average of four of the trimeric heterocyclic groups above referred to and that the average value of $n$ in Equations 5 and 6 is at least 2. For example, a phenyl ethyl silicon resin having the structure shown in Equation 6 with $n$ equal to 2 and obtained by the removal of phenyl groups from phenyl silicone has theoretically a silica content of 51.9%, a carbon content of 51.9% and a molecular weight of 1386. A sample of such resin which has been polymerized by treatment with hydrochloric acid with substantial absence of air to the stage of a sticky, viscous resin just short of insolubility gave on analysis a silica content of 49.5% $SiO_2$. For a polymer having the structure shown in Equation 5 with $n$ equal to 2, the corresponding theoretical values are 43.0% $SiO_2$, 60.2% C., and 1674 molecular weight. A determination of the average molecular weight of a similar sample by the method referred to above yielded the result 1310. As pointed out above, subsequent further polymerization results in an increase in the size of the molecule through the probable inclusion therein of additional trimeric heterocyclic groups. The determination of the molecular weight of the final insoluble resin would be extremely difficult, if not impossible, and hence the number of such groups comprising the final resin cannot be stated but it is believed to be at least four.

In the above described processes for producing the new products from disubstituted organo silicon compounds, some of the radicals are removed leaving the product to some extent monosubstituted. Thus it is seen that in the structural formulas of the polymerized products shown in Equations 5 and 6 and 9 the heterocyclic groups constituting the end groups of the compounds each contain two disubstituted silicon atoms and one monosubstituted silicon atom, while the heterocyclic groups constituting the intermediate groups each contain one disubstituted and two monosubstituted silicon atoms. I have found that a product having substantially the same properties and hence probably consisting also of a like combination of groups containing mono- and disubstituted silicon atoms can be produced by the direct combination under suitable conditions of the individual mono- and disubstituted compounds. I have found that a mixture of mono- and disubstituted silicon chlorides, for example, phenyl silicon trichloride and phenyl ethyl silicon dichloride in the proportions of one part of the former and two parts of the latter, when hydrolyzed by water and heated at about 170° C. in accordance with the procedure set forth above, will produce a viscous heat-convertible polymer of substantially the same properties as is obtained by the like treatment of phenyl ethyl silicon dichloride alone. It is believed that during the dehydration of the intermediate hydroxyl compounds the monosubstituted material is joined with the disubstituted material to form the heterocyclic chain compounds shown above. The conjoint use of some of the monosubstituted material is advantageous because the process of polymerization is thereby shortened.

It is further believed that when mixtures of various substituted silicon chlorides are hydrolyzed and dehydrated they tend to come down to a common product which is a heterocyclic chain compound, as hereinbefore described. Hence, in the prepartion of my new products it is advantageous, for some purposes at least, to use the crude or unpurified disubstituted silicon dichloride, obtained as shown in Equations 1 and 2, and by the introduction of water to hydrolyze the mixture and by heating at about 170°–180° C. to dehydrate and polymerize it.

The new resins are excellent coating and impregnating agents, particularly in the fabrication of electrical insulating materials, because in their intermediate form they can be dissolved and applied in the form of solutions for the impregnation of various fibrous materials and thereafter can be polymerized to complete insolubility and infusibility. In the latter state they have rubber-like characteristics and good electrical properties at room temperature, all of which are retained at temperatures above those at which prior resins break down and deteriorate. The new resins are relatively non-flammable and do not leave a carbonaceous residue when decomposed.

In making use of the new resins for impregnating tapes and other fibrous materials for electrical insulation the polymerization is carried out until the material has attained the sticky, viscous state just short of insolubility, after which it is cooled and dissolved in toluene or other solvent. The solution is applied by dipping, brushing or spraying, followed by evaporation of the solvent. Several applications of the solution may be required to produce a coating of sufficient thickness. When the solvent has completely evaporated the coated article is baked for several hours at a temperature from 200°–300° C. until the resin is tack-free. With the phenylethyl silicon resin of Equation 6 this condition is attained by baking for about 36 hours while the temperature is slowly raised from about 200° C. to about 260° C. Other silicon resins within the scope of my invention may require different temperatures and times but such conditions are readily determined by trial.

Comparative tests have shown that at normal temperatures the above described resins are equally as good as the average of prior resins and impregnating media with respect to flexibility and electrical characteristics in general and are superior with respect to power factor loss. At higher temperatures the new resins are superior in that they retain their flexibility and electrical properties long after the prior materials have failed.

For example, glass cloth approximately .005 inch in thickness, which has been impregnated with the phenylethyl silicon resin and cured as above described, has an average electrical resistance of about 600 megohms per square inch at a temperature of about 40° C. and a relative humidity of 90%, using 225 volts D. C. Under the same conditons three typical 10 mil commercial varnished cloths had an average electrical resistance of 285, 395 and 50 megohms per square inch respectively. The average dielectric strength of the resin impregnated glass cloth is about 1500 volts per mil. Samples of such impregnated glass cloth were further heated at about 260° C. for about 48 hours with no substantial change in flexibility being apparent. At a temperature of about 200° C. similar samples were heated for nearly three weeks without substantial change in flexibility. The first apparent change in the new resins upon such drastic heat temperature is a general whitening thereof which always occurs before the flexibility is affected. After being heated for six days at about 240° C., the dielectric strength of such samples is still in excess of 1000 volts per mil.

Similar glass cloth which has been impregnated with the best of prior heat resisting varnishes becomes blackened and brittle when heated for 24 hours at about 180° C.

The new resins adhere well to glass under both dry and wet conditions. It was found therefore that the impregnation of glass fibre yarn with the new resins increases the flexing endurance of the yarn many fold. In performing the test, the yarn was flexed over a freely rotatable steel mandrel one-eighth inch in diameter at a tension of three-fourths of a pound. Breakage of the yarn constituted failure. The test was performed first by using dry yarn and then by pouring water on the yarn while flexing it over the mandrel. With dry, untreated yarn from 700 to 1000 flexes could be obtained, but when wet with water, the untreated yarn withstood only 30 to 40 flexes before failure. When the yarn was previously impregnated wtih the phenylethyl silicon resin, from 2000 to 3000 dry flexes and from 650 to 1200 wet flexes were obtained before failure. When the yarn was impregnated with dimethyl silicon resin, 1600 to 1700 dry flexes and 600 to 800 wet flexes were obtained.

Figure 2:
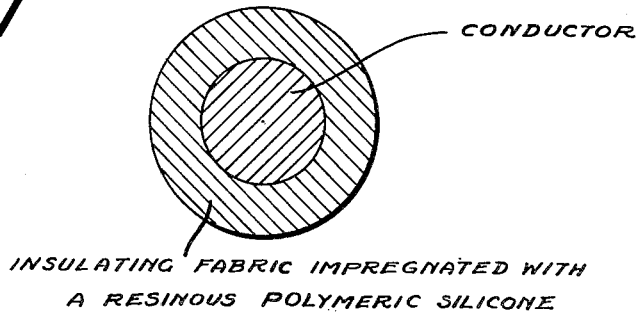

The high degree of flexibility of the new resins when properly cured, and their ability to retain their flexibility and electrical properties at temperatures above 200° C. for extended periods of time makes them particularly suitable as coatings per se on wire in lieu of the prior enamels and varnishes employed for coating magnet wire and the like. In the accompanying drawing Fig. 1 represents a cross-sectional view of a metallic conductor having an insulating outer layer containing a resinous polymeric silicone and Fig. 2 represents a cross-sectional view of a metallic conductor having thereon an insulating fabric impregnated with a resinous polymeric silicone.

Tests have shown that the phenylethyl silicon resin will withstand immersion in a standard transformer oil heated at 100° C. for fifteen minutes without flaking or disintegration or loss of dielectric strength. Consequently, fabrics impregnated with the new resins are suitable for use under conditions involving not only elevated temperatures but also contact with oil and grease such as are encountered by brake linings for automotive vehicles and the like.

I claim:

1. An electrical insulating material composed of glass fibre impregnated with an insulating resinous organo-silicon oxide composition comprising essentially silicon atoms, oxygen atoms, phenyl radicals and ethyl radicals, said silicon atoms being joined to each other by said oxygen atoms through silicon-oxygen linkages, said phenyl and ethyl radicals being attached to silicon atoms through carbon-silicon linkages, said composition having an average molecular weight above 1300.

2. A metallic conductor which is covered with an electrically insulating layer containing a resinous organo-silicon oxide composition which is substantially insoluble and infusible and which comprises essentially silicon atoms, oxygen atoms and alkyl and aryl radicals, said silicon atoms being connected to each other by said oxygen atoms through silicon-oxygen linkages, said alkyl and aryl radicals being attached to silicon atoms through carbon-silicon linkages, and the ratio of the total number of alkyl and aryl radicals to the total number of silicon atoms being between approximately one and approximately two.

3. A metallic conductor which is covered with an electrically insulating layer containing a resinous organo-silicon oxide composition comprising essentially silicon atoms, oxygen atoms, and phenyl and ethyl radicals, said silicon atoms being connected to each other by said oxygen atoms through silicon-oxygen linkages and said phenyl and ethyl radicals being connected to said silicon atoms through carbon-silicon linkages, said composition having an average molecular weight above 1300, and being substantially infusible and insoluble.

4. A metallic conductor which is covered with an electrically insulating textile fabric impregnated with a resinous organo-silicon oxide composition comprising essentially silicon atoms, oxygen atoms, and phenyl and ethyl radicals, said silicon atoms being attached to each other by said oxygen atoms through silicon-oxygen linkages and said phenyl and ethyl radicals being connected to silicon atoms through carbon-silicon linkages, said composition having an average molecular weight above 1300.

5. A metallic conductor which is covered with an electrically insulating layer containing a resinous organo silicon oxide composition comprising recurring units which correspond to the empirical formulae $(C_6H_5)(C_2H_5)SiO$ and $(C_6H_5)SiO_{3/2}$ respectively, said units being joined together by silicon-oxygen linkages.

6. A metallic conductor which is covered with an electrically insulating layer containing a resinous organo silicon oxide composition comprising recurring units which correspond to the empirical formulae $(C_6H_5)(C_2H_5)SiO$ and $(C_2H_5)SiO_{3/2}$ respectively, said units being joined together by silicon-oxygen linkages.

7. An electrically insulating material consisting of an inorganic textile material impregnated with an insulating resinous organo-silicon oxide composition comprising essentially silicon atoms, oxygen atoms, and alkyl and aryl radicals, said silicon atoms being connected to each other by said oxygen atoms through silicon-oxygen linkages, said alkyl and aryl radicals being attached to silicon through carbon-silicon linkages, the ratio of the total number of alkyl and aryl radicals to the total number of silicon atoms being between approximately one and approximately two.

8. An electrically insulating material consisting of a glass fabric impregnated with an insulating resinous organo-silicon oxide composition comprising essentially silicon atoms, oxygen atoms, and alkyl and aryl radicals, said silicon atoms being connected to each other by said oxygen atoms through silicon-oxygen linkages, said alkyl and aryl radicals being attached to silicon through carbon-silicon linkages, the ratio of the total number of alkyl and aryl radicals to the total number of silicon atoms being between approximately one and approximately two.

9. A metallic conductor which is covered with an electrically insulating layer containing a resinous organo-silicon oxide composition comprising essentially silicon atoms, oxygen atoms, and alkyl and aryl radicals, said silicon atoms being connected to each other by said oxygen atoms through silicon-oxygen linkages, said alkyl and aryl radicals being attached to silicon through carbon-silicon linkages, the ratio of the total number of alkyl and aryl radicals to the total number of silicon atoms being between approximately one and approximately two.

10. A metallic conductor which is coated with an electrically insulating layer containing a resinous organo-silicon oxide composition comprising recurring units corresponding to the empirical formulae $RR'SiO$ and $R''SiO_{3/2}$ respectively, where $R$ and $R''$ are alkyl radicals and $R'$ is an aryl radical, said radicals being attached to silicon atoms through carbon-silicon linkages, and said units being joined together by silicon-oxygen linkages.

11. A metallic conductor which is coated with an electrically insulating layer containing a resinous organo-silicon oxide composition comprising recurring units corresponding to the empirical formulae $RR'SiO$ and $R''SiO_{3/2}$ respectively, where $R$ and $R''$ are lower alkyl radicals and $R'$ is a phenyl radical, said radicals being attached to silicon atoms through carbon-silicon linkages, and said units being joined together by silicon-oxygen linkages.

12. A metallic conductor which is coated with an electrically insulating layer containing a resinous organo-silicon oxide composition comprising recurring units corresponding to the empirical formulae $RR'SiO$ and $R''SiO_{3/2}$ respectively, where $R$ and $R''$ are phenyl radicals and $R'$ is a lower alkyl radical, said radicals being attached to silicon atoms through carbon-silicon linkages, and said units being joined together by silicon-oxygen linkages.

13. A metallic conductor which is covered with an electrically insulating layer comprising a glass fabric impregnated with a resinous organo-silicon oxide composition comprising essentially recurring units corresponding to the empirical formulae $RR'SiO$ and $R''SiO_{3/2}$ respectively, where $R$ and $R''$ are alkyl radicals and $R'$ is an aryl radical, said radicals being attached to silicon atoms by carbon silicon linkages and said units being connected together by silicon-oxygen linkages.

14. A metallic conductor which is covered with an electrically insulating layer comprising a glass fabric impregnated with a resinous organo-silicon oxide composition comprising essentially recurring units corresponding to the empirical formulae $RR'SiO$ and $R''SiO_{3/2}$ respectively, where $R$ and $R''$ are lower alkyl radicals and $R'$ is a phenyl radical, said radicals being attached to silicon atoms by carbon-silicon linkages and said units being connected together by silicon-oxygen linkages.

15. A metallic conductor which is covered with an electrically insulating layer comprising a glass fabric impregnated with a resinous organo-silicon oxide composition comprising essentially recurring units corresponding to the empirical formulae $(C_2H_5)(C_6H_5)SiO$ and $(C_2H_5)SiO_{3/2}$ said units being connected together by silicon-oxygen linkages.

16. A metallic conductor which is covered with an electrically insulating layer comprising a glass fabric impregnated with a resinous organo-silicon oxide composition comprising essentially recurring units corresponding to the empirical formulae $RR'SiO$ and $R''SiO_{3/2}$ respectively, where $R$ and $R''$ are phenyl radicals and $R'$ is a lower alkyl radical, said radicals being attached to silicon atoms by carbon-silicon linkages and said units being connected together by silicon-oxygen linkages.

17. A metallic conductor which is covered with an electrically insulating layer comprising a glass fabric impregnated with a resinous organo-silicon oxide composition comprising essentially recurring units corresponding to the empirical formulae $(C_6H_5)(C_2H_5)SiO$ and $(C_6H_5)SiO_{3/2}$, said units being connected together by silicon-oxygen linkages.

18. A metallic conductor which is covered with an electrically insulating layer comprising an inorganic textile material impregnated with a resinous organo-silicon oxide composition comprising essentially silicon atoms, oxygen atoms and alkyl and aryl radicals, said silicon atoms being connected to each other by said oxygen atoms through silicon-oxygen linkages, said alkyl and aryl radicals being attached to silicon atoms through carbon-silicon linkages, the ratio of the total number of alkyl and aryl radicals to the total number of silicon atoms being between approximately one and approximately two.

19. An electrically insulating material composed of an inorganic textile fabric impregnated with an insulating resinous organo-silicon oxide composition comprising essentially recurring units corresponding to the empirical formulae $RR'SiO$ and $R''SiO_{3/2}$ respectively, where $R$ and $R''$ are lower alkyl radicals and $R'$ is a phenyl radical, said units being joined together through silicon-oxygen linkages and said hydrocarbon radicals being attached to silicon atoms through carbon-silicon linkages.

20. An electrically insulating material composed of an inorganic textile fabric impregnated with an insulating resinous organo-silicon oxide composition comprising essentially recurring units corresponding to the empirical formulae $RR'SiO$ and $R''SiO_{3/2}$ respectively, where $R$ and $R''$ are phenyl radicals and $R'$ is a lower alkyl radical, said units being joined together through silicon-oxygen linkages and said hydrocarbon radicals being attached to silicon atoms through carbon-silicon linkages.

JAMES FRANKLIN HYDE.